US012084989B2

(12) United States Patent
Kato et al.

(10) Patent No.: US 12,084,989 B2
(45) Date of Patent: Sep. 10, 2024

(54) CURVATURE ADJUSTMENT METHOD FOR STATOR BLADE SEGMENT, METHOD FOR MANUFACTURING STATIONARY BODY OF AXIAL-FLOW ROTARY MACHINE, AND CURVATURE ADJUSTMENT JIG FOR STATOR BLADE SEGMENT

(71) Applicant: MITSUBISHI HEAVY INDUSTRIES, LTD., Tokyo (JP)

(72) Inventors: Shin Kato, Tokyo (JP); Shingo Yamasue, Tokyo (JP); Yoshio Tominaga, Tokyo (JP); Ryota Chaki, Tokyo (JP); Hirokazu Azuma, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/282,603

(22) PCT Filed: Feb. 16, 2022

(86) PCT No.: PCT/JP2022/006222

§ 371 (c)(1),
(2) Date: Sep. 18, 2023

(87) PCT Pub. No.: WO2022/201988

PCT Pub. Date: Sep. 29, 2022

(65) Prior Publication Data

US 2024/0167388 A1 May 23, 2024

(30) Foreign Application Priority Data

Mar. 26, 2021 (JP) ................................ 2021-053628

(51) Int. Cl.
*F01D 9/04* (2006.01)

(52) U.S. Cl.
CPC ........ *F01D 9/041* (2013.01); *F05D 2230/644* (2013.01); *F05D 2240/12* (2013.01)

(58) Field of Classification Search
CPC . F01D 9/041; F05D 2230/644; F05D 2240/12
See application file for complete search history.

(56) References Cited

U.S. PATENT DOCUMENTS 3,414,958 A * 12/1968 Anderson ............ B23P 15/006 269/37
4,451,979 A 6/1984 Schuster (Continued)

FOREIGN PATENT DOCUMENTS

DE 4329014 C1 * 1/1995 .......... F01D 21/045
FR 2710103 A1 * 5/1995 ........... F01D 11/006

(Continued)

OTHER PUBLICATIONS

International Search Report issued Apr. 26, 2022 in corresponding International Application No. PCT/JP2022/006222, with English language translation.

(Continued)

*Primary Examiner* — Jesse S Bogue
(74) *Attorney, Agent, or Firm* — Wenderoth, Lind & Ponack, L.L.P.

(57) ABSTRACT

A curvature adjustment method is applied to an arc-shaped stator vane segment having a plurality of stator blades disposed side by side on the outer peripheral side of an arc-shaped inner coupling member. In the curvature adjustment method, a jig preparation step, a jig mounting step, and a curvature adjustment step are executed. In the jig preparation step, a curvature adjustment jig and a distance adjustment mechanism are prepared. In the jig mounting step, with the distance adjustment mechanism placed on the inner peripheral side of the inner coupling member, a first end is fixed at a first position of the inner coupling member, and a (Continued)

second end is fixed at a second position of the inner coupling member. In the curvature adjustment step, the distance adjustment mechanism is operated after the jig mounting step to change the distance between the first and second ends of the curvature adjustment jig.

5 Claims, 8 Drawing Sheets

(56) References Cited

U.S. PATENT DOCUMENTS

| | | | | | |
|---|---|---|---|---|---|
| 5,673,883 | A * | 10/1997 | Figueroa, Jr. | E04G 21/241 248/200.1 |
| 5,971,362 | A * | 10/1999 | Clark | E04F 21/1872 254/100 |
| 11,548,660 | B2 * | 1/2023 | Henriksen | F01D 25/285 |
| 11,598,224 | B2 * | 3/2023 | Rochin Machado | F01D 25/24 |
| 2013/0011241 | A1 | 1/2013 | Skaustein et al. | |
| 2016/0312705 | A1 * | 10/2016 | Corradi | F02C 3/04 |
| 2017/0191381 | A1 * | 7/2017 | Baba | F01D 25/28 |
| 2020/0325786 | A1 * | 10/2020 | Bailly | F01D 25/285 |

FOREIGN PATENT DOCUMENTS

| | | | |
|---|---|---|---|
| JP | 51-24730 | | 7/1976 |
| JP | 57-106356 | | 7/1982 |
| JP | 2012-13046 | | 1/2012 |
| JP | 2012013046 | A * | 1/2012 |
| JP | 5501875 | B2 * | 5/2014 |
| JP | 2017-122438 | | 7/2017 |

OTHER PUBLICATIONS

Written Opinion of the International Searching Authority issued Apr. 26, 2022 in corresponding International Application No. PCT/JP2022/006222, with English language translation.

* cited by examiner

CURVATURE ADJUSTMENT METHOD FOR STATOR BLADE SEGMENT, METHOD FOR MANUFACTURING STATIONARY BODY OF AXIAL-FLOW ROTARY MACHINE, AND CURVATURE ADJUSTMENT JIG FOR STATOR BLADE SEGMENT

TECHNICAL FIELD

The present disclosure relates to a curvature adjustment technique for a stator vane segment in an axial-flow rotary machine.

Priority is claimed on Japanese Patent Application No. 2021-053628 filed on Mar. 26, 2021, the content of which is incorporated herein by reference.

BACKGROUND ART

An axial-flow rotary machine includes a rotor rotating around an axis, a plurality of stator vane segments arranged in a circumferential direction with respect to the axis, and a stator vane holding ring that extends in the circumferential direction and that holds the plurality of stator vane segments. Each of the plurality of stator vane segments includes a plurality of stator vanes and an inner connecting member having an arc-like shape with respect to the axis. The plurality of stator vanes are attached to an outer peripheral side of the inner connecting member in a state of being arranged in the circumferential direction.

PTL 1 below discloses a disassembling method for a steam turbine, which is a type of axial-flow rotary machine. The steam turbine includes, as a plurality of stator vane segments, a vane ring upper-half portion and a vane ring lower-half portion. Additionally, the steam turbine includes, as a plurality of stator vane holding rings, an internal casing upper-half portion and an internal casing lower-half portion. Both ends of the vane ring upper-half portion in a circumferential direction are connected to both ends of the vane ring lower-half portion. Both ends of the internal casing upper-half portion in the circumferential direction are connected to both ends of the internal casing lower-half portion. The vane ring upper-half portion is disposed on an inner peripheral side of the internal casing upper-half portion. The vane ring lower-half portion is disposed on an inner peripheral side of the internal casing lower-half portion.

In the disassembling method for a steam turbine in PTL 1, first, the internal casing upper-half portion is detached from the internal casing lower-half portion. Next, a perfect circle maintaining device is attached to both end portions of the vane ring lower-half portion in the circumferential direction, which are on an outer peripheral side of the vane ring lower-half portion. The perfect circle maintaining device connects both end portions of the vane ring lower-half portion in the circumferential direction, which are on the outer peripheral side of the vane ring lower-half portion, and both end portions of the internal casing lower-half portion in the circumferential direction, which are on an inner peripheral side of the internal casing lower-half portion, to each other. Then, the vane ring upper-half portion is detached from the vane ring lower-half portion to which the perfect circle maintaining device is attached. As described above, in the disassembling method for a steam turbine in PTL 1, the perfect circle maintaining device connects both end portions of the vane ring lower-half portion in the circumferential direction, which are on the outer peripheral side of the vane ring lower-half portion, and both end portions of the internal casing lower-half portion in the circumferential direction, which are on the inner peripheral side of the internal casing lower-half portion, to each other. Therefore, in the disassembling method for a steam turbine in PTL 1, deformation toward an inner peripheral side of both end portions of the vane ring lower-half portion in the circumferential direction can be suppressed even when the vane ring upper-half portion is detached from the vane ring lower-half portion and thus it is possible to maintain the roundness of the vane ring lower-half portion.

CITATION LIST

Patent Literature

[PTL 1] Japanese Unexamined Patent Application Publication No. 2012-013046

SUMMARY OF INVENTION

Technical Problem

As described above, in the disassembling method for a steam turbine in PTL 1, the perfect circle maintaining device connects both end portions of the vane ring lower-half portion in the circumferential direction, which are on the outer peripheral side of the vane ring lower-half portion, and both end portions of the internal casing lower-half portion in the circumferential direction, which are on the inner peripheral side of the internal casing lower-half portion, to each other so that deformation toward the inner peripheral side of both end portions of the vane ring lower-half portion in the circumferential direction is suppressed. Therefore, in a case where the vane ring lower-half portion is detached from the internal casing lower-half portion, the roundness of the vane ring lower-half portion (in other words, the curvature of the vane ring lower-half portion) cannot be maintained. Therefore, in the method described in PTL 1 above, there is a high probability that the curvature of the vane ring lower-half portion, which is a stator vane segment, is not a predetermined curvature when the vane ring lower-half portion, which is the stator vane segment, is attached to the internal casing lower-half portion serving, which is a stator vane holding ring. It is difficult to attach the stator vane segment to an inner peripheral side of the stator vane holding ring in a state where the curvature of the stator vane segment is not the predetermined curvature as described above.

Therefore, an object of the present disclosure is to provide a technique with which it is possible to easily attach a stator vane segment to an inner peripheral side of a stator vane holding ring.

Solution to Problem

A curvature adjustment method for a stator vane segment according to an aspect for achieving the above-described object is for a stator vane segment that has an arc-like shape with a plurality of stator vanes attached to an outer peripheral side of an inner connecting member having an arc-like shape such that the stator vanes are arranged in a circumferential direction.

The curvature adjustment method includes executing a jig preparation step of preparing a curvature adjustment jig that includes a first end, a second end, and a distance adjustment mechanism able to change a distance between the first end and the second end, executing a jig attachment step of fixing the first end of the curvature adjustment jig to a first position of the inner connecting member and fixing the second end of the curvature adjustment jig to a second position of the inner connecting member that is separated from the first position of the inner connecting member in the circumferential direction in a state where the distance adjustment mechanism of the curvature adjustment jig is disposed on an inner peripheral side of the inner connecting member of the stator vane segment, and executing a curvature adjustment step of operating the distance adjustment mechanism after the jig attachment step to change the distance between the first end and the second end of the curvature adjustment jig such that a curvature of an outer peripheral edge of the stator vane segment having the arc-like shape is made equal to a target curvature.

In the present aspect, at a stage where the curvature of the stator vane segment is adjusted by means of the curvature adjustment jig, the distance adjustment mechanism of the curvature adjustment jig is positioned on an inner peripheral side of the stator vane segment. Therefore, it is possible to attach the stator vane segment, to which the curvature adjustment jig has been attached, to the inner peripheral side of the stator vane holding ring without the curvature adjustment jig interfering with the stator vane holding ring. That is, in the present aspect, it is possible to attach the stator vane segment to the inner peripheral side of the stator vane holding ring in a state where the curvature of the stator vane segment is a predetermined curvature. Therefore, in the present aspect, it is possible to easily attach the stator vane segment to the inner peripheral side of the stator vane holding ring.

A method for manufacturing a stationary body of an axial-flow rotary machine according to an aspect for achieving the above-described object includes executing the curvature adjustment method for a stator vane segment in the above-described aspect. Furthermore, the method includes executing a component preparation step of preparing the stator vane segment and a stator vane holding ring that has an arc-like shape and that is provided with an inner peripheral side to which the stator vane segment is attached, executing a stator vane segment attachment step of attaching, to the inner peripheral side of the stator vane holding ring, the stator vane segment after the curvature adjustment step to which the curvature adjustment jig has been attached, and executing a jig removal step of removing the curvature adjustment jig from the stator vane segment after the stator vane segment attachment step.

In the present aspect, it is possible to easily attach the stator vane segment to the inner peripheral side of the stator vane holding ring.

Therefore, according to the present aspect, stationary body manufacturing efficiency can be enhanced.

A curvature adjustment jig for a stator vane segment according to an aspect for achieving the above-described object is for a stator vane segment that has an arc-like shape with a plurality of stator vanes attached to an outer peripheral side of an inner connecting member having an arc-like shape such that the stator vanes are arranged in a circumferential direction.

The curvature adjustment jig includes: a first base including a first end; a second base including a second end; a first fixation portion with which the first end is fixable to a first position of the inner connecting member; a second fixation portion with which the second end is fixable to a second position of the inner connecting member, the second position being separated from the first position in the circumferential direction; and a distance adjustment mechanism able to change a distance between the first end and the second end. The distance adjustment mechanism is positioned on an inner peripheral side of the inner connecting member in a state where the first end is fixed to the first position of the inner connecting member and the second end is fixed to the second position of the inner connecting member. The distance adjustment mechanism includes a body portion, a first rod member that extends from the body portion to a first side out of both sides in a distance adjustment direction in a distance-adjustable manner, and a second rod member that extends from the body portion to a second side opposite to the first side in the distance adjustment direction in a distance-adjustable manner. The first base is attached to a portion of the first rod member that is on the first side such that the first base is swingable around an axis extending in a direction perpendicular to the distance adjustment direction. The second base is attached to a portion of the second rod member that is on the second side such that the second base is swingable around an axis extending in the direction perpendicular to the distance adjustment direction.

When the curvature adjustment jig of the present aspect is to be attached to the stator vane segment, the first end of the first base is fixed to the first position of the inner connecting member of the stator vane segment and the second end of the second base is fixed to the second position of the inner connecting member of the stator vane segment. In such a state, the distance adjustment mechanism of the curvature adjustment jig is positioned on the inner peripheral side of the stator vane segment. Therefore, it is possible to attach the stator vane segment, to which the curvature adjustment jig has been attached, to the inner peripheral side of the stator vane holding ring without the curvature adjustment jig interfering with the stator vane holding ring.

Advantageous Effects of Invention

According to the aspects of the present disclosure, it is possible to easily attach a stator vane segment to an inner peripheral side of a stator vane holding ring.

DESCRIPTION OF EMBODIMENTS

Hereinafter, an embodiment of the present invention will be described in detail with reference to FIGS. 1 to 8.

[Axial-Flow Rotary Machine]

First, a gas turbine including an axial-flow rotary machine will be described with reference to FIGS. 1 to 4.

Figure 1:
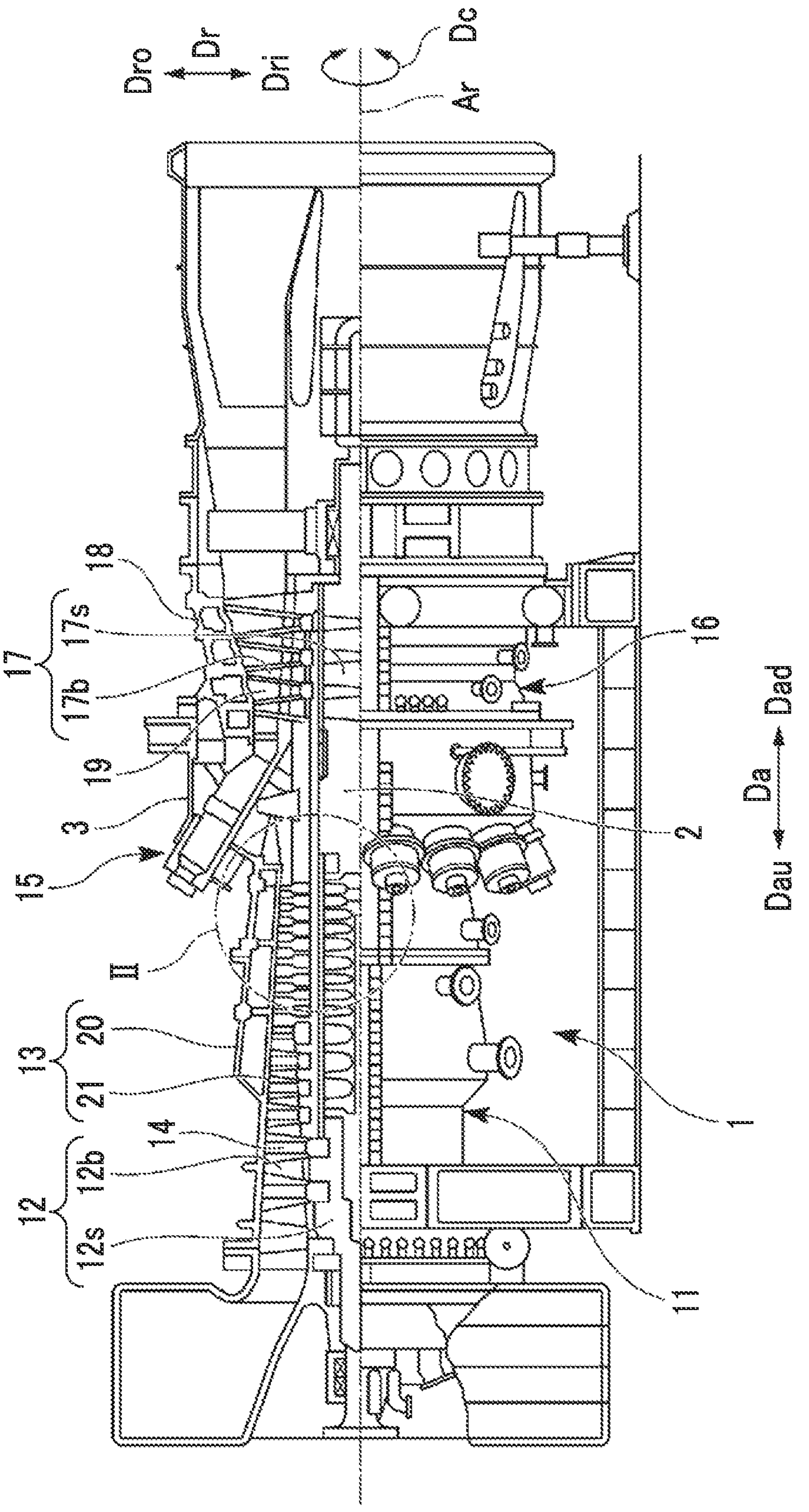
FIG. 1 is a sectional side view of a main part of a gas turbine according to an embodiment of the present disclosure.

As shown in FIG. 1, a gas turbine 1 includes a compressor 11 that compresses outside air to generate compressed air, a combustor 15 that combusts fuel from a fuel supply source in the compressed air to generate combustion gas, and a turbine 16 that is driven by the combustion gas.

The compressor 11 is a type of axial-flow rotary machine. The compressor 11 includes a compressor rotor 12 that rotates around an axis Ar, a compressor casing 13 that covers the compressor rotor 12, and a plurality of stator vane rows 14. The turbine 16 is a type of axial-flow rotary machine as well. The turbine 16 includes a turbine rotor 17 that rotates around the axis Ar, a turbine casing 18 that covers the turbine rotor 17, and a plurality of stator vane rows 19.

The compressor 11 is disposed, with respect to the turbine 16, on an axial upstream side Dau out of the axial upstream side Dau and an axial downstream side Dad in an axial direction Da in which the axis Ar extends. The compressor rotor 12 and the turbine rotor 17 are positioned on the same axis Ar and are connected to each other to form a gas turbine rotor 2. For example, a rotor of a generator is connected to the gas turbine rotor 2.

The compressor rotor 12 includes a rotor shaft 12*s* that is centered on the axis Ar and that extends in the axial direction Da and a plurality of rotor blade rows 12*b*. The plurality of rotor blade rows 12*b* are provided on the rotor shaft 12*s* to be arranged in the axial direction Da. Each of the rotor blade rows 12*b* includes a plurality of rotor blades arranged in a circumferential direction Dc with respect to the axis Ar. For each of the plurality of the rotor blade rows 12*b*, one of the plurality of stator vane rows 14 is disposed on the axial downstream side Dad. The plurality of the stator vane rows 14 are provided on an inner peripheral side of the compressor casing 13.

The turbine rotor 17 includes a rotor shaft 17*s* that rotates around the axis Ar and that extends in the axial direction Da, and a plurality of rotor blade rows 17*b*. The plurality of rotor blade rows 17*b* are provided on the rotor shaft 17*s* to be arranged in the axial direction Da. Each of the rotor blade rows 17*b* includes a plurality of rotor blades arranged in the circumferential direction Dc with respect to the axis Ar. For each of the plurality of the rotor blade rows 17*b*, one of the plurality of stator vane rows 19 is disposed on the axial upstream side Dau. The plurality of the stator vane rows 19 are provided on an inner peripheral side of the turbine casing 18.

The gas turbine 1 further includes an intermediate casing 3. The compressor casing 13, the intermediate casing 3, and the turbine casing 18 are connected to each other to be arranged in this order in the axial direction Da. The combustor 15 is provided in the intermediate casing 3.

Figure 2:
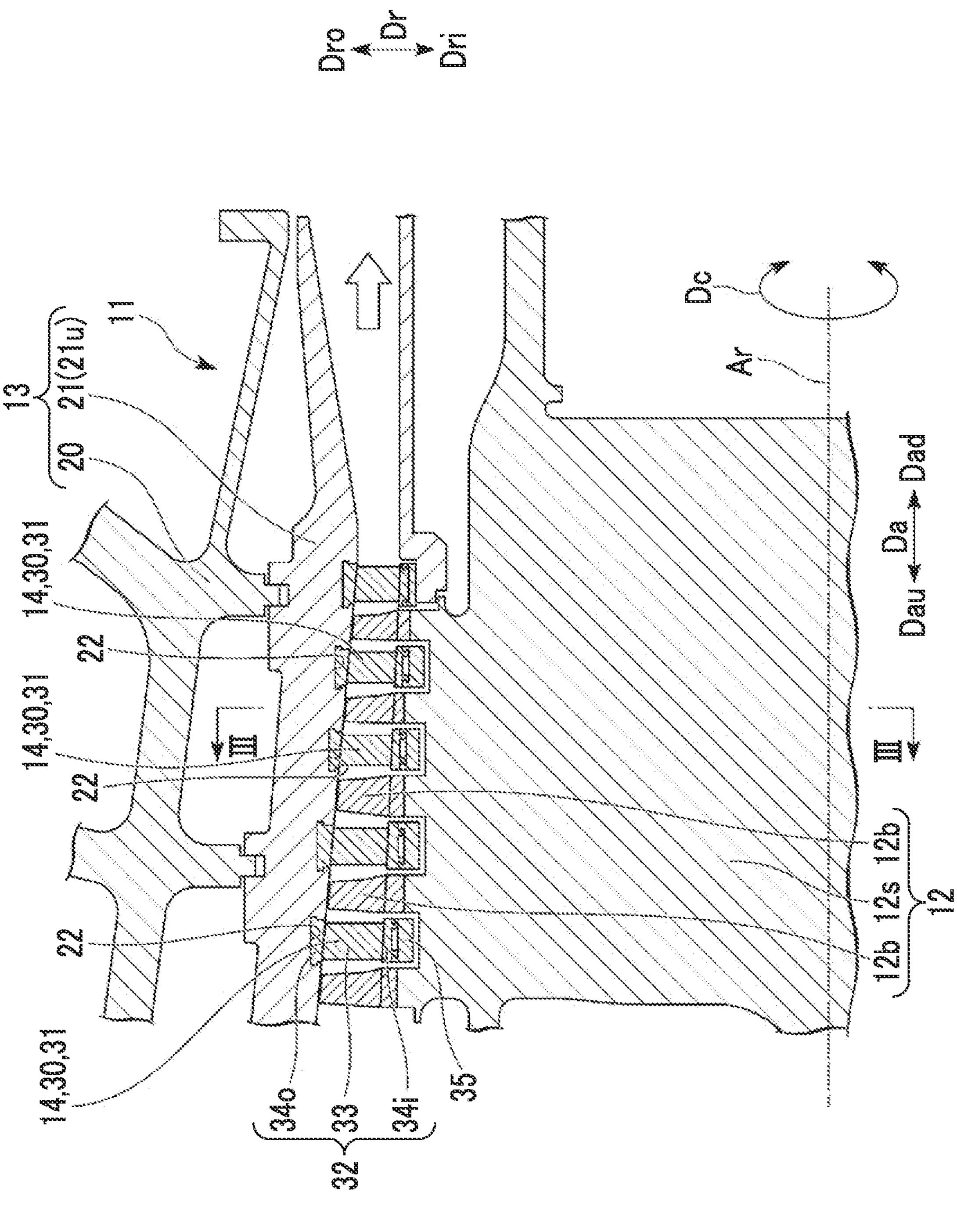
FIG. 2 is an enlarged view of part II of FIG. 1.
Figure 3:
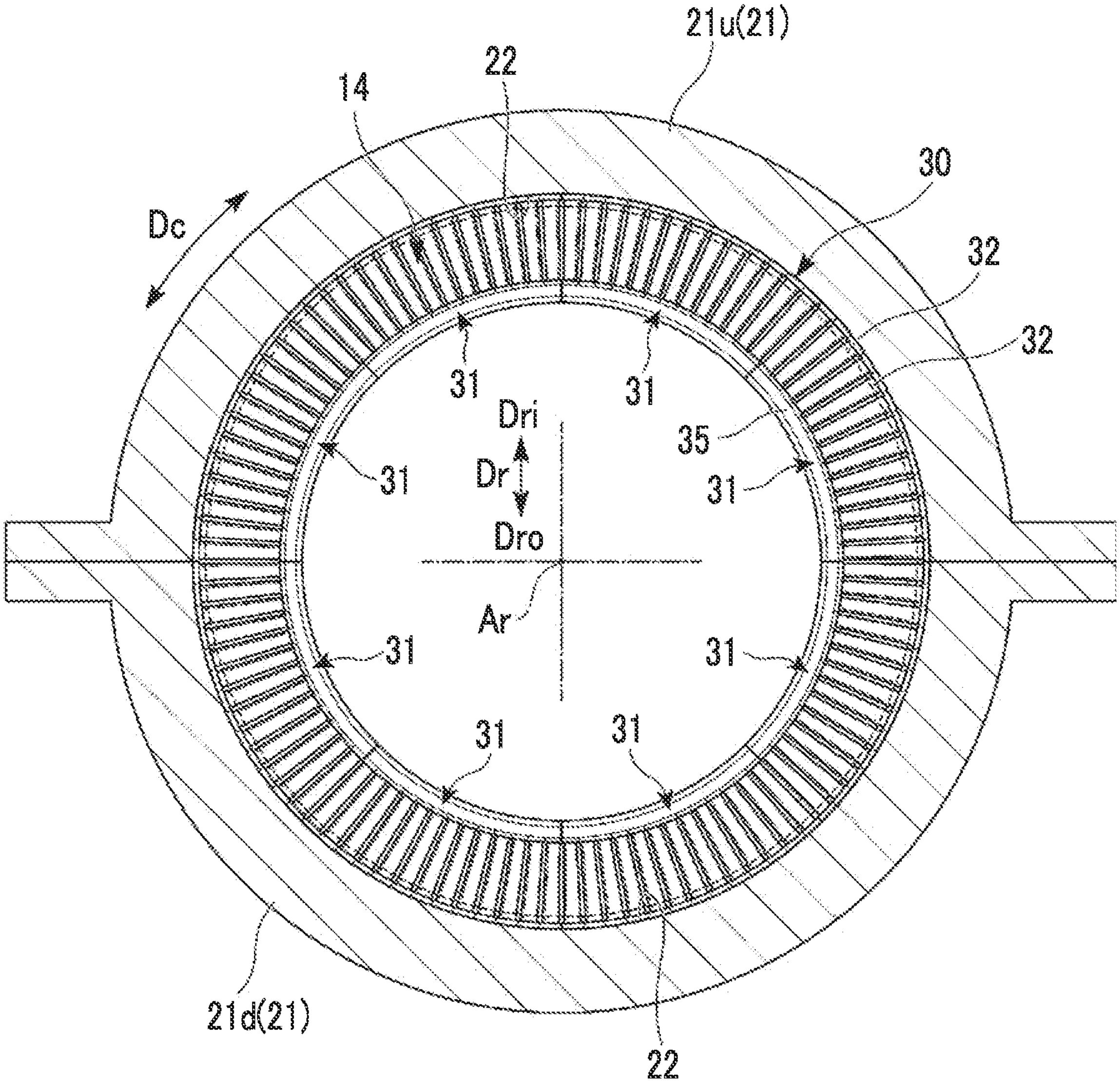
FIG. 3 is a cross-sectional view taken along line III-III in FIG. 2.

As shown in FIGS. 2 and 3, the compressor casing 13 includes a casing main body 20 having a tubular shape centered on the axis Ar and a stator vane holding ring 21 disposed on an inner peripheral side of the casing main body 20. The casing main body 20 includes an upper-half casing and a lower-half casing for the sake of convenience at the time of assembly. The upper-half casing forms an upper-half portion of the casing main body 20. The lower-half casing forms a lower-half portion of the casing main body 20. The stator vane holding ring 21 has a tubular shape centered on the axis Ar. The stator vane holding ring 21 has an upper-half stator vane holding ring 21*u* and a lower-half stator vane holding ring 21*d* for the sake of convenience at the time of assembly. The upper-half stator vane holding ring 21*u* forms an upper-half portion of the stator vane holding ring 21. The lower-half stator vane holding ring 21*d* forms a lower-half portion of the stator vane holding ring 21.

The stator vane holding ring 21 is provided with a plurality of annular grooves 22 that are formed to be recessed toward a radial outer side Dro with respect to the axis Ar and that have an annular shape centered on the axis Ar. The plurality of annular grooves 22 are arranged in the axial direction Da.

The compressor 11 includes a plurality of stator vane rings 30. The plurality of stator vane rings 30 are arranged in the axial direction Da. Each of the stator vane rings 30 includes any one of the plurality of stator vane rows 14. An outer peripheral portion of each of the stator vane rings 30 is fitted to any one of the plurality of annular grooves 22. Each of the stator vane rings 30 can be divided into a plurality of stator vane segments 31 in the circumferential direction Dc for the sake of convenience of at the time of assembly. In the present embodiment, one stator vane ring 30 can be divided into eight stator vane segments 31. Outer peripheral portions of four of the eight stator vane segments 31 are fitted to one annular groove 22 of the upper-half stator vane holding ring 21*u*. Outer peripheral portions of the other four of the eight stator vane segments 31 are fitted to one annular groove 22 of the lower-half stator vane holding ring 21*d*. Although one stator vane ring 30 is composed of eight stator vane segments 31 herein, one stator vane ring may be composed of less than eight stator vane segments (specifically, six or four stator vane segments) and one stator vane ring may be composed of more than eight stator vane segments (for example, ten or twelve stator vane segments).

A stationary body of the compressor 11 in the present embodiment includes the upper-half stator vane holding ring 21*u*, the lower-half stator vane holding ring 21*d*, and the plurality of stator vane segments 31 mounted thereto.

Figure 4:
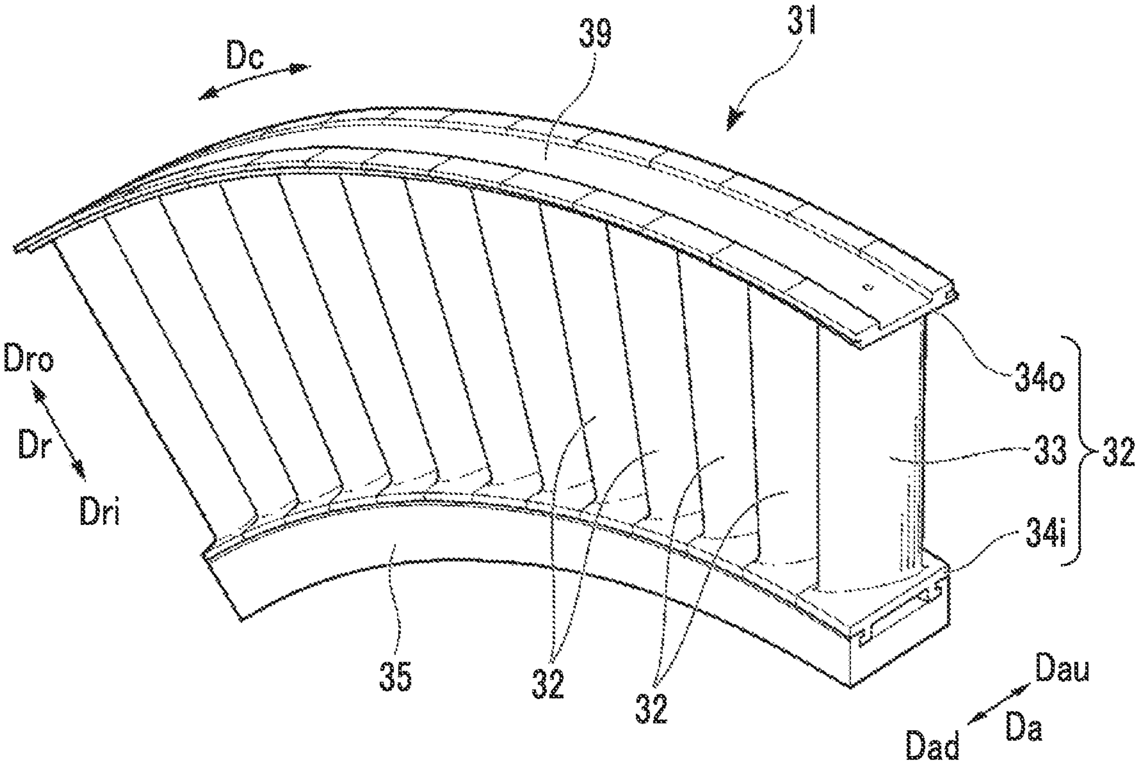
FIG. 4 is a perspective view of a stator vane segment according to the embodiment of the present disclosure.

As shown in FIG. 4, one stator vane segment 31 has an arc-like shape. The stator vane segment 31 includes a plurality of stator vanes 32, a connection holder 35 serving as an inner connecting member, and a connection band 39 serving as an outer connecting member.

The plurality of stator vanes 32 are arranged in the circumferential direction Dc between the connection holder 35 and the connection band 39. The stator vane 32 includes a vane body 33 extending in a radial direction Dr, an inner shroud 34*i* provided on a radial inner side Dri of the vane body 33, and an outer shroud 34*o* provided on a radial outer side Dro of the vane body 33. The connection holder 35 has an arc-like shape. The inner shroud 34*i* of each stator vane 32 is mounted to the connection holder 35. Additionally, the connection band 39 also has an arc-like shape. The outer shroud 34*o* of each stator vane 32 is connected to the connection band 39 by being welded or screwed, for example. Therefore, the connection band 39 connects the outer shrouds 34*o* of the stator vanes 32 to each other. An outer peripheral portion of the stator vane segment 31 that is fitted to the annular groove 22 of the stator vane holding ring 21 as described above includes the connection band 39 and the outer shrouds 34*o* of the stator vanes 32.

In a case where the curvature of the outer peripheral portion of the stator vane segment 31 does not match the curvature of the annular groove 22, it is difficult to fit the outer peripheral portion of the stator vane segment 31 to the annular groove 22. Even if the curvature of the connection holder 35 before assembly is the curvature as designed and the curvature of the connection band 39 before assembly is the curvature as designed, the curvatures may be changed while the stator vane segment 31 is being assembled. For example, in a case where the outer shrouds 34*o* of the stator vanes 32 are welded to the connection band 39, the curvature of the outer peripheral portion of the stator vane segment 31 is decreased. Therefore, hereinafter, a curvature adjustment method or the like for the stator vane segment 31 will be described.

[Curvature Adjustment Method for Stator Vane Segment, Method for Manufacturing Stationary Body of Axial-Flow Rotary Machine, and Curvature Adjustment Jig for Stator Vane Segment]

A curvature adjustment method for a stator vane segment, a method for manufacturing a stationary body of an axial-flow rotary machine, and a curvature adjustment jig for a stator vane segment will be described with reference to FIGS. 5 to 8.

Figure 5:
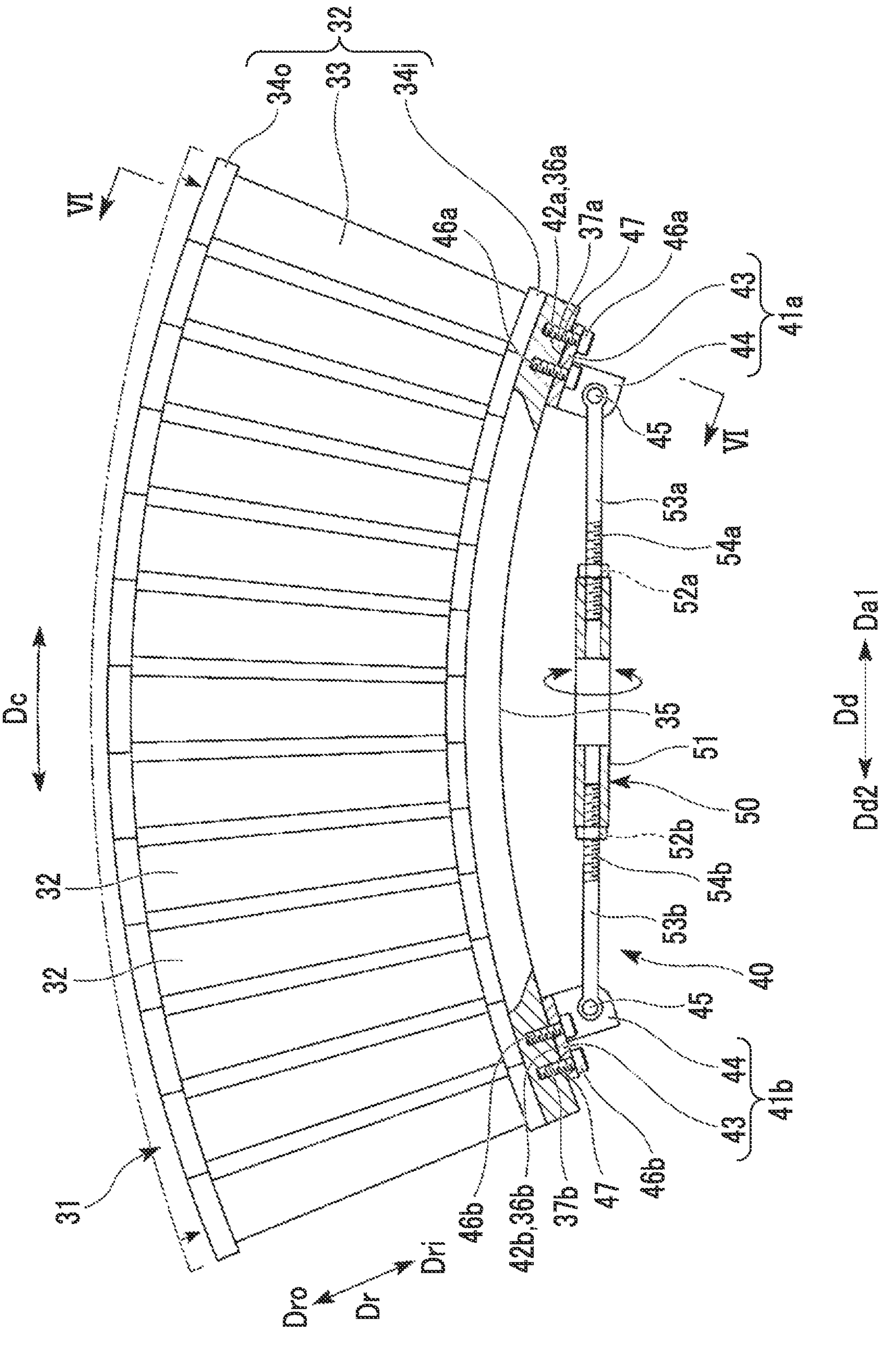
FIG. 5 is a front view showing the stator vane segment according to the embodiment of the present invention and a curvature adjustment jig.
Figure 6:
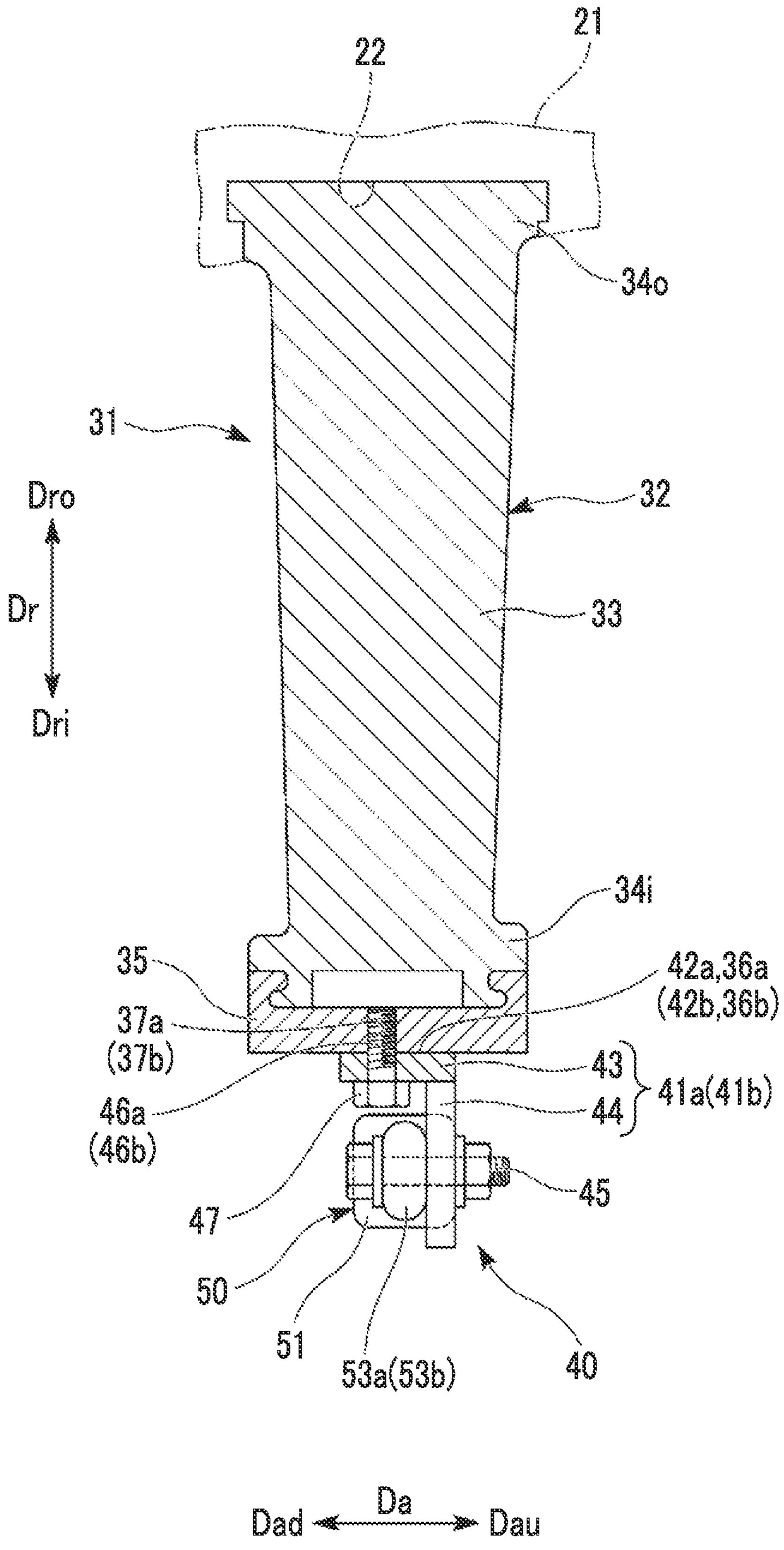
FIG. 6 is a cross-sectional view taken along line VI-VI in FIG. 5.

First, a curvature adjustment jig 40 used in the curvature adjustment method for a stator vane segment will be described with reference to FIGS. 5 and 6.

The curvature adjustment jig 40 includes a first base 41*a*, a second base 41*b*, a first fixation portion 46*a*, a second fixation portion 46*b*, and a turnbuckle 50 serving as a distance adjustment mechanism.

The turnbuckle 50 includes a body portion 51, a first rod member 53*a*, and a second rod member 53*b*.

A first female screw 52*a* extending in a distance adjustment direction Dd is formed at a portion of the body portion 51 that is on a first side Dd1 out of both sides in the distance adjustment direction Dd. Furthermore, a second female screw 52*b* extending in the distance adjustment direction Dd is formed at a portion of the body portion 51 that is on a second side Dd2 out of both sides in the distance adjustment direction Dd. The second female screw 52*b* is a reverse screw with respect to the first female screw 52*a*. That is, when the first female screw 52*a* is a right-handed screw, the second female screw 52*b* is a left-handed screw. Both the first rod member 53*a* and the second rod member 53*b* are rod members extending in the distance adjustment direction Dd. A first male screw 54*a* screwed into the first female screw 52*a* is formed at a portion of the first rod member 53*a* that is on the second side Dd2. A second male screw 54*b* screwed into the second female screw 52*b* is formed at a portion of the second rod member 53*b* that is on the first side Dd1.

Each of the first base 41*a* and the second base 41*b* includes a holder contact plate portion 43 that can come into contact with an inner peripheral surface of the connection holder 35 and a buckle connection plate portion 44 that can be connected to the turnbuckle 50. The buckle connection plate portion 44 extends from an edge of the holder contact plate portion 43 in a direction intersecting the holder contact plate portion 43. A portion of a surface of the holder contact plate portion 43 of the first base 41*a* is a first end 42*a*. In addition, a portion of a surface of the holder contact plate portion 43 of the second base 41*b* is a second end 42*b*. The buckle connection plate portion 44 of the first base 41*a* is attached, via a pin 45, to a portion of the first rod member 53*a* that is on the first side Dd1. Therefore, the first base 41*a* is swingable, with respect to the first rod member 53*a*, about an axis extending in a direction perpendicular to the distance adjustment direction Dd. The buckle connection plate portion 44 of the second base 41*b* is attached, via the pin 45, to a portion of the second rod member 53*b* that is on the second side Dd2. Therefore, the second base 41*b* is swingable, with respect to the second rod member 53*b*, about an axis extending in a direction perpendicular to the distance adjustment direction Dd.

Each of the first fixation portion 46*a* and the second fixation portion 46*b* includes bolts 47. A portion of the inner peripheral surface of the connection holder 35 that is on one side in the circumferential direction Dc is a first position 36*a* and a portion of the inner peripheral surface that is on the other side in the circumferential direction Dc is a second position 36*b*. Therefore, the second position 36*b* is a position that is separated from the first position 36*a* in the circumferential direction Dc. First screw holes 37*a* and second screw holes 37*b* that are recessed toward the radial outer side Dro from the inner peripheral surface are formed at the connection holder 35. The first screw holes 37*a* are formed in the vicinity of the first position 36*a* described above, and the second screw holes 37*b* are formed in the vicinity of the second position 36*b* described above. When the first end 42*a* of the curvature adjustment jig 40 is to be fixed to the first position 36*a* of the connection holder 35, first, the first end 42*a* of the first base 41*a* is brought into contact with the first position 36*a* of the connection holder 35. Next, the bolts 47 of the first fixation portion 46*a* are screwed into the first screw holes 37*a* of the connection holder 35 via the holder contact plate portion 43 of the first base 41*a*. As a result, the first end 42*a* of the curvature adjustment jig 40 is fixed to the first position 36*a* of the connection holder 35. Additionally, when the second end 42*b* of the curvature adjustment jig 40 is to be fixed to the second position 36*b* of the connection holder 35, first, the second end 42*b* of the second base 41*b* is brought into contact with the second position 36*b* of the connection holder 35. Next, the bolts 47 of the second fixation portion 46*b* are screwed into the second screw holes 37*b* of the connection holder 35 via the holder contact plate portion 43 of the second base 41*b*. As a result, the second end 42*b* of the curvature adjustment jig 40 is fixed to the second position 36*b* of the connection holder 35.

In a case where the body portion 51 of the turnbuckle 50 is rotated around an axis extending in the distance adjustment direction Dd, the first rod member 53*a* relatively moves, with respect to the body portion 51, toward one of the first side Dd1 and the second side Dd2 in the distance adjustment direction Dd and the second rod member 53*b* relatively moves toward the other of the first side Dd1 and the second side Dd2. Therefore, in the case of the curvature adjustment jig 40 described above, it is possible to change a distance between the first end 42*a* of the first base 41*a* and the second end 42*b* of the second base 41*b* by rotating the body portion 51 of the turnbuckle 50.

Figure 7:
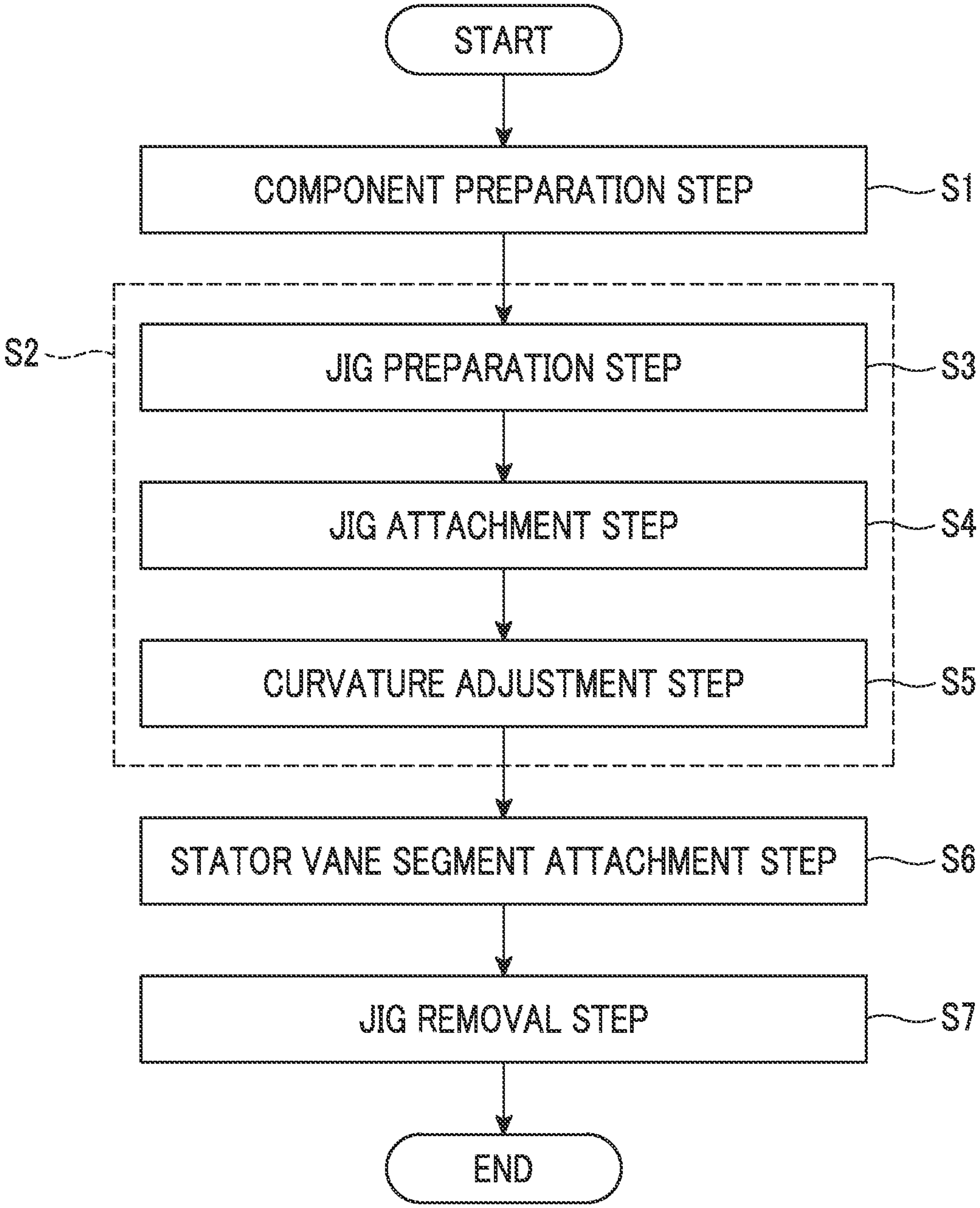
FIG. 7 is a flowchart showing the procedure for a method for manufacturing a stationary body according to the embodiment of the present invention.

Next, a curvature adjustment method for the stator vane segment 31 and a method for manufacturing a stationary body of an axial-flow rotary machine will be described with reference to a flowchart shown in FIG. 7.

First, a component preparation step S1 is executed. In the component preparation step S1, components constituting a stationary body of the compressor 11, which is an axial-flow rotary machine, are prepared. Examples of the components constituting the stationary body include the upper-half stator vane holding ring 21*u*, the lower-half stator vane holding ring 21*d*, and the plurality of stator vane segments 31 mounted thereto.

Next, a jig preparation step S3 is executed. In the jig preparation step S3, the curvature adjustment jig 40 described above is prepared.

Next, a jig attachment step S4 is executed. In the jig attachment step S4, the curvature adjustment jig 40 is attached to the connection holder 35 of the stator vane segment 31. Specifically, first, the turnbuckle 50 of the curvature adjustment jig 40 is disposed on the inner peripheral side of the stator vane segment 31. Next, as described above, the first end 42*a* of the first base 41*a* is brought into contact with the first position 36*a* of the connection holder 35. Then, the bolts 47 of the first fixation portion 46*a* are screwed into the first screw holes 37*a* of the connection holder 35 via the holder contact plate portion 43 of the first base 41*a*. As a result, the first end 42*a* of the curvature adjustment jig 40 is fixed to the first position 36*a* of the connection holder 35. Furthermore, the second end 42*b* of the second base 41*b* is brought into contact with the second position 36*b* of the connection holder 35. Then, the bolts 47 of the second fixation portion 46*b* are screwed into the second screw holes 37*b* of the connection holder 35 via the holder contact plate portion 43 of the second base 41*b*. As a result, the second end 42*b* of the curvature adjustment jig 40 is fixed to the second position 36*b* of the connection holder 35. Through the above-described process, the jig attachment step S4 is finished.

Next, a curvature adjustment step S5 is executed. In the curvature adjustment step S5, the body portion 51 of the turnbuckle 50 is rotated to change the distance between the first end 42*a* and the second end 42*b* of the curvature adjustment jig 40 such that the curvature of an outer peripheral edge of the stator vane segment 31 is made equal to a target curvature. Here, the target curvature is the curvature of an inner peripheral edge of the stator vane holding ring 21, specifically, the curvature of a groove bottom surface of the annular groove 22. Therefore, in a case where the curvature of the outer peripheral edge of the stator vane segment 31 is to be made equal to the target curvature, for example, a linear distance between a position where the groove bottom surface of the annular groove 22 comes into contact with one end of the stator vane segment 31 in the circumferential direction Dc and a position where the groove bottom surface of the annular groove 22 comes into contact with the other end of the stator vane segment 31 in the circumferential direction Dc is measured and the linear distance is set as a target distance. Then, the body portion 51 of the turnbuckle 50 is rotated such that a linear distance between one end of an outer peripheral edge of the stator vane segment 31 in the circumferential direction Dc and the other end of the outer peripheral edge of the stator vane segment 31 in the circumferential direction Dc is made equal to the target distance.

In a curvature adjustment method S2 for the stator vane segment 31, the jig preparation step S3, the jig attachment step S4, and the curvature adjustment step S5 as described above are executed. Note that the jig preparation step S3 may be executed before the component preparation step S1 as long as the jig preparation step S3 is executed before the jig attachment step S4.

Figure 8:
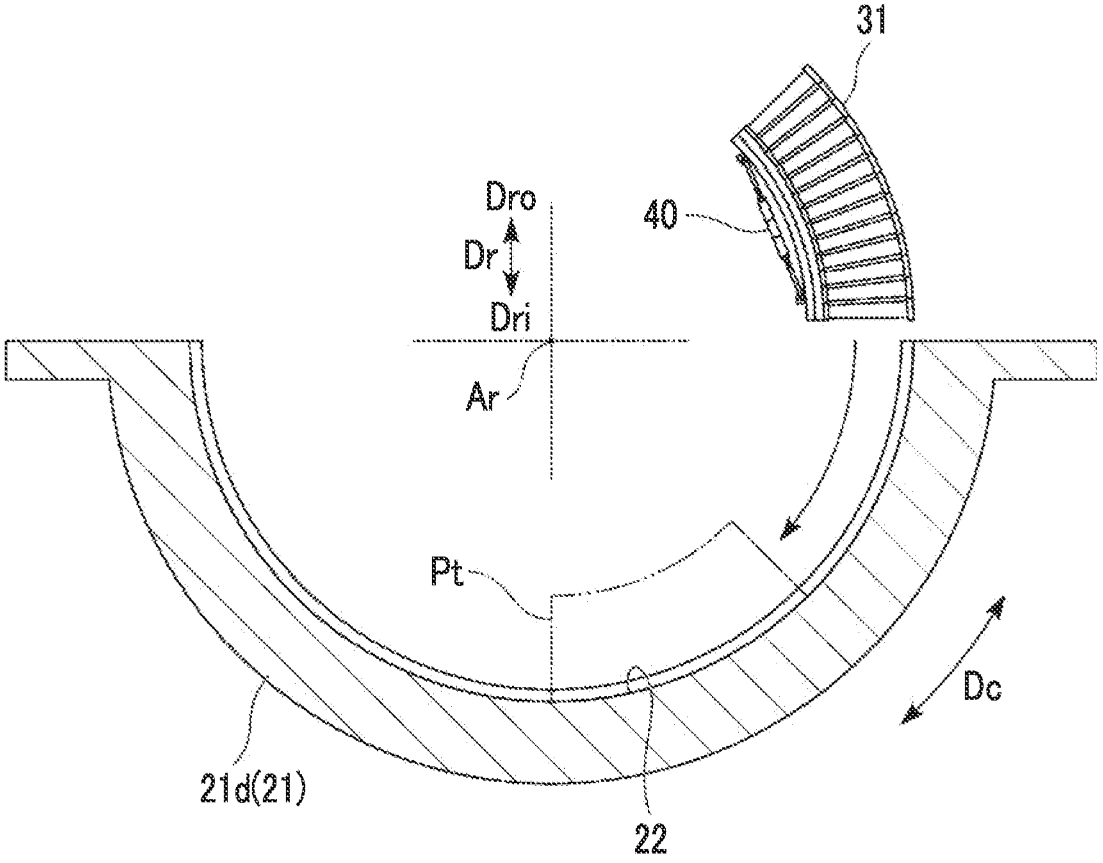
FIG. 8 is an explanatory diagram showing a manufacturing process for a stationary body according to the embodiment of the present invention.

Next, a stator vane segment attachment step S6 is executed. In the stator vane segment attachment step S6, as shown in FIG. 8, the stator vane segment 31 after the curvature adjustment step S5, to which the curvature adjustment jig 40 has been attached, is attached to the inner peripheral side of the stator vane holding ring 21. At this time, the stator vane segment 31 is disposed such that the outer peripheral edge of the stator vane segment 31 is positioned on a line along which the groove bottom surface of the annular groove 22 extends in the circumferential direction Dc. Then, the stator vane segment 31 to which the curvature adjustment jig 40 has been attached is moved in the circumferential direction Dc and an outer peripheral portion of the stator vane segment 31 is inserted into the annular groove 22. Then, attachment of the stator vane segment 31 to the stator vane holding ring 21 is finished when the outer peripheral portion of the stator vane segment 31 is at a target position Pt in the annular groove 22.

When the attachment of the stator vane segment 31 is finished, a jig removal step S7 is executed. In the jig removal step S7, the curvature adjustment jig 40 is removed from the stator vane segment 31.

When attachment of all the stator vane segments 31 to the annular groove 22 is finished, the stationary body is completed.

As described above, in the present embodiment, at a stage where the curvature of the stator vane segment 31 is adjusted by means of the curvature adjustment jig 40, the turnbuckle 50 of the curvature adjustment jig 40 is positioned on an inner peripheral side of the stator vane segment 31. Therefore, it is possible to attach the stator vane segment 31, to which the curvature adjustment jig 40 has been attached, to the inner peripheral side of the stator vane holding ring 21 without the curvature adjustment jig 40 interfering with the stator vane holding ring 21. That is, in the present embodiment, it is possible to attach the stator vane segment 31 to the inner peripheral side of the stator vane holding ring 21 in a state where the curvature of the stator vane segment 31 is a predetermined curvature. Therefore, in the present embodiment, it is possible to easily attach the stator vane segment 31 to the inner peripheral side of the stator vane holding ring 21.

Modification Example

Each of the first fixation portion 46*a* and the second fixation portion 46*b* of the curvature adjustment jig 40 in the above-described embodiment includes the bolts 47. However, each fixation portion may include any member as long as each base can be fixed to a target position of the connection holder 35, and may include, for example, a clamp that sandwiches a portion of the connection holder 35.

In the above-described embodiment, the compressor 11 of the gas turbine 1 has been used as an example as the axial-flow rotary machine. However, the axial-flow rotary machine may be any axial-flow rotary machine as long as the axial-flow rotary machine includes a stator vane segment, and may be, for example, the turbine 16 of the gas turbine 1 or a steam turbine.

An embodiment of the present disclosure has been described above. However, the present disclosure is not limited to the above embodiment. Various additions, changes, replacements, partial deletions, and the like are possible within a scope which does not depart from the conceptual idea and gist of the present invention which are derived from the content defined in the claims and equivalents thereof.

APPENDIX

The curvature adjustment method for a stator vane segment in the above-described embodiment is understood as follows, for example.

(1) A curvature adjustment method for a stator vane segment according to a first aspect is for the stator vane segment 31 that has an arc-like shape with the plurality of stator vanes 32 attached to an outer peripheral side of the inner connecting member 35 having an arc-like shape such that the stator vanes 32 are arranged in the circumferential direction Dc.

The curvature adjustment method includes executing the jig preparation step S3 of preparing the curvature adjustment jig 40 that includes the first end 42*a*, the second end 42*b*, and the distance adjustment mechanism 50 able to change a distance between the first end 42*a* and the second end 42*b*, executing the jig attachment step S4 of fixing the first end 42*a* of the curvature adjustment jig 40 to the first position 36*a* of the inner connecting member 35 and fixing the second end 42*b* of the curvature adjustment jig 40 to the second position 36*b* of the inner connecting member 35 that is separated from the first position 36*a* of the inner connecting member 35 in the circumferential direction Dc in a state where the distance adjustment mechanism 50 of the curvature adjustment jig 40 is disposed on an inner peripheral side of the inner connecting member 35 of the stator vane segment 31, and executing the curvature adjustment step S5 of operating the distance adjustment mechanism after the jig attachment step S4 to change the distance between the first end 42*a* and the second end 42*b* of the curvature adjustment jig 40 such that a curvature of an outer peripheral edge of the stator vane segment 31 having the arc-like shape is made equal to a target curvature.

In the present aspect, at a stage where the curvature of the stator vane segment 31 is adjusted by means of the curvature adjustment jig 40, the distance adjustment mechanism 50 of the curvature adjustment jig 40 is positioned on an inner peripheral side of the stator vane segment 31. Therefore, it is possible to attach the stator vane segment 31, to which the curvature adjustment jig 40 has been attached, to the inner peripheral side of the stator vane holding ring 21 without the curvature adjustment jig 40 interfering with the stator vane holding ring 21. That is, in the present aspect, it is possible to attach the stator vane segment 31 to the inner peripheral side of the stator vane holding ring 21 in a state where the curvature of the stator vane segment 31 is a predetermined curvature. Therefore, in the present aspect, it is possible to easily attach the stator vane segment 31 to the inner peripheral side of the stator vane holding ring 21.

(2) A curvature adjustment method for a stator vane segment according to a second aspect is the curvature adjustment method for the stator vane segment 31 in the first aspect in which the curvature adjustment jig 40 includes the first base 41*a* including the first end 42*a*, the second base 41*b* including the second end 42*b*, the first fixation portion 46*a* with which the first end 42*a* is fixable to the first position 36*a* of the inner connecting member 35, the second fixation portion 46*b* with which the second end 42*b* is fixable to the second position 36*b* of the inner connecting member 35, and the distance adjustment mechanism 50. The distance adjustment mechanism 50 includes the body portion 51, the first rod member 53*a* that extends from the body portion 51 to the first side Dd1 out of both sides in the distance adjustment direction Dd in a distance-adjustable manner, and the second rod member 53*b* that extends from the body portion 51 to the second side Dd2 opposite to the first side Dd1 in the distance adjustment direction Dd in a distance-adjustable manner. The first base 41*a* is attached to a portion of the first rod member 53*a* that is on the first side Dd1 such that the first base 41*a* is swingable around an axis extending in a direction perpendicular to the distance adjustment direction Dd. The second base 41*b* is attached to a portion of the second rod member 53*b* that is on the second side Dd2 such that the second base 41*b* is swingable around an axis extending in the direction perpendicular to the distance adjustment direction Dd.

(3) A curvature adjustment method for a stator vane segment according to a third aspect is the curvature adjustment method for the stator vane segment 31 in the second aspect in which the first female screw 52*a* extending in the distance adjustment direction Dd is formed at a portion of the body portion 51 that is on the first side Dd1 and the second female screw 52*b* extending in the distance adjustment direction Dd is formed at a portion of the body portion 51 that is on the second side Dd2. The second female screw 52*b* is a reverse screw with respect to the first female screw 52*a*. The first male screw 54*a* screwed into the first female screw 52*a* is formed at a portion of the first rod member 53*a* that is on the second side Dd2. The second male screw 54*b* screwed into the second female screw 52*b* is formed at a portion of the second rod member 53*b* that is on the first side Dd1.

The method for manufacturing a stationary body of an axial-flow rotary machine in the above-described embodiment is understood as follows, for example.

(4) A method for manufacturing a stationary body of an axial-flow rotary machine according to a fourth aspect includes executing the curvature adjustment method for the stator vane segment 31 according to any one of the first to third aspects. Furthermore, the method includes executing the component preparation step S1 of preparing the stator vane segment 31 and the stator vane holding ring 21 that has an arc-like shape and that is provided with an inner peripheral side to which the stator vane segment 31 is attached, executing the stator vane segment attachment step S6 of attaching, to the inner peripheral side of the stator vane holding ring 21, the stator vane segment 31 after the curvature adjustment step S5 to which the curvature adjustment jig 40 has been attached, and executing the jig removal step S7 of removing the curvature adjustment jig 40 from the stator vane segment 31 after the stator vane segment attachment step S6.

In the present aspect, it is possible to easily attach the stator vane segment 31 to the inner peripheral side of the stator vane holding ring 21. Therefore, according to the present aspect, stationary body manufacturing efficiency can be enhanced.

(5) A method for manufacturing a stationary body of an axial-flow rotary machine according to a fifth aspect is the method for manufacturing a stationary body of an axial-flow rotary machine according to the fourth aspect in which, in the curvature adjustment step S5, the distance between the first end 42*a* and the second end 42*b* of the curvature adjustment jig 40 is changed such that the curvature of the outer peripheral edge of the stator vane segment 31 is made equal to a curvature of an inner peripheral edge of the stator vane holding ring 21.

The curvature adjustment jig for a stator vane segment in the above-described embodiment is understood as follows, for example.

(6) A curvature adjustment jig for a stator vane segment according to a sixth aspect is for the stator vane segment 31 with the plurality of stator vanes 32 attached to an outer peripheral side of the inner connecting member 35 having an arc-like shape such that the stator vanes 32 are arranged in the circumferential direction Dc.

The curvature adjustment jig 40 includes: the first base 41*a* including the first end 42*a*; the second base 41*b* including the second end 42*b*; the first fixation portion 46*a* with which the first end 42*a* is fixable to the first position 36*a* of the inner connecting member 35; the second fixation portion 46*b* with which the second end 42*b* is fixable to the second position 36*b* of the inner connecting member 35, the second position 36*b* being separated from the first position 36*a* in the circumferential direction Dc; and the distance adjustment mechanism 50 able to change a distance between the first end 42*a* and the second end 42*b*. The distance adjustment mechanism 50 is positioned on an inner peripheral side of the inner connecting member 35 in a state where the first end 42*a* is fixed to the first position 36*a* of the inner connecting member 35 and the second end 42*b* is fixed to the second position 36*b* of the inner connecting member 35. The distance adjustment mechanism 50 includes the body portion 51, the first rod member 53*a* that extends from the body portion 51 to the first side Dd1 out of both sides in the distance adjustment direction Dd in a distance-adjustable manner, and the second rod member 53*b* that extends from the body portion 51 to the second side Dd2 opposite to the first side Dd1 in the distance adjustment direction Dd in a distance-adjustable manner. The first base 41*a* is attached to a portion of the first rod member 53*a* that is on the first side Dd1 such that the first base 41*a* is swingable around an axis extending in a direction perpendicular to the distance adjustment direction Dd. The second base 41*b* is attached to a portion of the second rod member 53*b* that is on the second side Dd2 such that the second base 41*b* is swingable around an axis extending in the direction perpendicular to the distance adjustment direction Dd.

When the curvature adjustment jig 40 of the present aspect is to be attached to the stator vane segment 31, the first end 42*a* of the first base 41*a* is fixed to the first position 36*a* of the inner connecting member 35 of the stator vane segment 31 and the second end 42*b* of the second base 41*b* is fixed to the second position 36*b* of the inner connecting member 35 of the stator vane segment 31. In such a state, the distance adjustment mechanism 50 of the curvature adjustment jig 40 is positioned on the inner peripheral side of the stator vane segment 31. Therefore, it is possible to attach the stator vane segment 31, to which the curvature adjustment jig 40 has been attached, to the inner peripheral side of the stator vane holding ring 21 without the curvature adjustment jig 40 interfering with the stator vane holding ring 21.

(7) A curvature adjustment jig for a stator vane segment according to a seventh aspect is the curvature adjustment jig for a stator vane segment in the sixth aspect in which the first female screw 52*a* extending in the distance adjustment direction Dd is formed at a portion of the body portion 51 that is on the first side Dd1 and the second female screw 52*b* extending in the distance adjustment direction Dd is formed at a portion of the body portion 51 that is on the second side Dd2. The second female screw 52*b* is a reverse screw with respect to the first female screw 52*a*. The first male screw 54*a* screwed into the first female screw 52*a* is formed at a portion of the first rod member 53*a* that is on the second side Dd2. The second male screw 54*b* screwed into the second female screw 52*b* is formed at a portion of the second rod member 53*b* that is on the first side Dd1.

INDUSTRIAL APPLICABILITY

According to the aspects of the present disclosure, it is possible to easily attach a stator vane segment to an inner peripheral side of a stator vane holding ring.

REFERENCE SIGNS LIST

1: gas turbine
2: gas turbine rotor
3: intermediate casing
11: compressor
12: compressor rotor
12*s*: rotor shaft
12*b*: rotor blade row
13: compressor casing
14: stator vane row
15: combustor
16: turbine
17: turbine rotor
17*s*: rotor shaft
17*b*: rotor blade row
18: turbine casing
19: stator vane row
20: casing main body
21: stator vane holding ring
21*u*: upper-half stator vane holding ring
21*d*: lower-half stator vane holding ring
22: annular groove
30: stator vane ring
31: stator vane segment
32: stator vane
33: vane body
34*i*: inner shroud
34*o*: outer shroud
35: connection holder (or inner connecting member)
36*a*: first position
36*b*: second position
37*a*: first screw hole
37*b*: second screw hole
39: connection band (or outer connecting member)
40: curvature adjustment jig
41*a*: first base
41*b*: second base
42*a*: first end
42*b*: second end
43: holder contact plate portion
44: buckle connection plate portion
45: pin
46*a*: first fixation portion
46*b*: second fixation portion
47: bolt
50: turnbuckle (or distance adjustment mechanism)
51: body portion
52*a*: first female screw
52*b*: second female screw
53*a*: first rod member
53*b*: second rod member
54*a*: first male screw
54*b*: second male screw
Ar: axis
Da: axial direction
Dau: axial upstream side
Dad: axial downstream side
Dc: circumferential direction
Dr: radial direction
Dri: radial inner side
Dro: radial outer side
Dd: distance adjustment direction
Dd1: first side
Dd2: second side

The invention claimed is:

1. A curvature adjustment method for a stator vane segment that has an arc-like shape with a plurality of stator vanes attached to an outer peripheral side of an inner connecting member having an arc-like shape such that the stator vanes are arranged in a circumferential direction, the method comprising:

executing a jig preparation step of preparing a curvature adjustment jig that includes a first end, a second end, and a distance adjustment mechanism able to change a distance between the first end and the second end;

executing a jig attachment step of fixing the first end of the curvature adjustment jig to a first position of the inner connecting member and fixing the second end of the curvature adjustment jig to a second position of the inner connecting member that is separated from the first position of the inner connecting member in the circumferential direction in a state where the distance adjustment mechanism of the curvature adjustment jig is disposed on an inner peripheral side of the inner connecting member of the stator vane segment; and executing a curvature adjustment step of operating the distance adjustment mechanism after the jig attachment step to change the distance between the first end and the second end of the curvature adjustment jig such that a curvature of an outer peripheral edge of the stator vane segment having the arc-like shape is made equal to a target curvature, wherein an outer peripheral portion of the stator vane segment is configured to fit to an annular groove that is recessed from an inner circumferential surface of the stator vane holding ring, which has an arc-like shape, and in the curvature adjustment step, a linear distance between a position where a groove bottom surface of the annular groove comes into contact with a first end of the stator vane segment in the circumferential direction and a position where the groove bottom surface of the annular groove comes into contact with a second end of the stator vane segment in the circumferential direction is measured and the linear distance is set as a target distance, and adjusting the curvature by changing the distance between the first end and the second end of the curvature adjustment jig such that a linear distance between a first end of the outer peripheral edge of the stator vane segment in the circumferential direction and a second end of the outer peripheral edge of the stator vane segment in the circumferential direction is made equal to the target distance.

2. The curvature adjustment method for a stator vane segment according to claim 1, wherein the curvature adjustment jig includes a first base including the first end, a second base including the second end, a first fixation portion with which the first end is fixable to the first position of the inner connecting member, a second fixation portion with which the second end is fixable to the second position of the inner connecting member, and the distance adjustment mechanism, the distance adjustment mechanism includes a body portion, a first rod member that extends from the body portion in a distance adjustment direction in a distance-adjustable manner, and a second rod member that extends from the body portion in the distance adjustment direction in a distance-adjustable manner, the first rod member extends to a first side out of both sides in the distance adjustment direction with respect to the body portion, the second rod member extends to a second side opposite to the first side in the distance adjustment direction with respect to the body portion, the first base is attached to a portion of the first rod member that is on the first side such that the first base is swingable around an axis extending in a direction perpendicular to the distance adjustment direction, and the second base is attached to a portion of the second rod member that is on the second side such that the second base is swingable around an axis extending in the direction perpendicular to the distance adjustment direction.

3. The curvature adjustment method for a stator vane segment according to claim 2, wherein a first female screw extending in the distance adjustment direction is formed at a portion of the body portion that is on the first side and a second female screw extending in the distance adjustment direction is formed at a portion of the body portion that is on the second side, the first female screw and second female screw are formed on an inner peripheral surface of the body portion, the second female screw is a reverse screw with respect to the first female screw, a first male screw screwed into the first female screw is formed at a portion of the first rod member that is on the second side, and a second male screw screwed into the second female screw is formed at a portion of the second rod member that is on the first side.

4. A method for manufacturing a stationary body of an axial-flow rotary machine, the method comprising:

executing the curvature adjustment method for a stator vane segment according to claim 1;

executing a component preparation step of preparing the stator vane segment and a stator vane holding ring;

executing a stator vane segment attachment step of attaching, to the inner peripheral side of the stator vane holding ring, the stator vane segment after the curvature adjustment step to which the curvature adjustment jig has been attached; and executing a jig removal step of removing the curvature adjustment jig from the stator vane segment after the stator vane segment attachment step.

5. The method for manufacturing a stationary body of an axial-flow rotary machine according to claim 4, wherein, in the curvature adjustment step, the distance between the first end and the second end of the curvature adjustment jig is changed such that the curvature of the outer peripheral edge of the stator vane segment is made equal to a curvature of an inner peripheral edge of the stator vane holding ring.

* * * * *